July 4, 1961 P. O. TAWNEY ET AL Re. 25,007
VULCANIZATION OF BUTYL RUBBER WITH PARA SUBSTITUTED PHENOL DIALCOHOLS, AND CURING BAG PRODUCED THEREBY
Original Filed Jan. 12, 1952
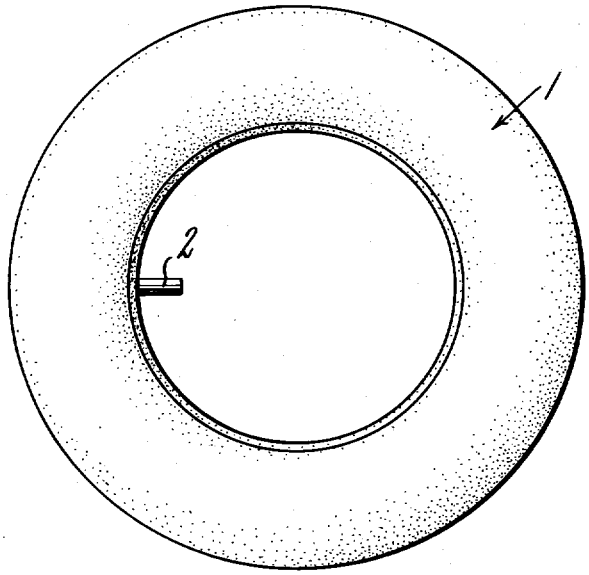
CURING BAG OF BUTYL RUBBER VULCANIZED WITH A PHENOL DIALCOHOL
INVENTORS
PLINY O. TAWNEY
JULIAN R. LITTLE
BY James J. Long
AGENT United States Patent Office Re. 25,007
Reissued July 4, 1961

25,007

VULCANIZATION OF BUTYL RUBBER WITH PARA SUBSTITUTED PHENOL DIALCOHOLS, AND CURING BAG PRODUCED THEREBY

Pliny O. Tawney, Passaic, and Julian R. Little, Wayne, N.J., assignors to United States Rubber Company, New York, N.Y., a corporation of New Jersey Original No. 2,701,895, dated Feb. 15, 1955, Ser. No. 266,146, Jan. 12, 1952. Application for reissue Dec. 23, 1960, Ser. No. 78,196
18 Claims. (Cl. 18—45)

Matter enclosed in heavy brackets [ ] appears in the original patent but forms no part of this reissue specification; matter printed in italics indicates the additions made by reissue.

This invention relates to a new method of vulcanizing Butyl rubber, by means of certain phenol dialcohols, namely, the para substituted phenol dialcohols and to the resulting improved vulcanized products, especially curing bags.

The term "vulcanization" is used herein in its commonly accepted sense and has reference to the process of converting the Butyl rubber from the raw state in which it is a weak material having the typical properties of a plastic gum, into a strong, non-plastic typically elastic material. Unvulcanized or uncured Butyl rubber, like other raw elastomers, has no definite elastic limit, that is, upon slow application of tensile stress it elongates or strings out almost indefinitely without breaking, and it exhibits virtually no elastic recovery after the stress is removed. On the other hand, vulcanized or cured Butyl rubber, in common with other typical vulcanized elastomers, has a definite elastic limit, as well as the ability to return to substantially its original length after being stretched as much as several hundred percent, that is, it exhibits high elastic recovery. The present invention is directed to an improved method of producing such vulcanized condition, as well as to the improved vulcanizates so obtained.

Butyl rubber is a well-known commercial synthetic rubber made by copolymerizing an isoolefin, usually isobutylene, with a minor proportion of a conjugated diolefin, usually isoprene [or butadiene]. The isoolefins used generally have from 4 to 7 carbon atoms, and such isomonoolefins as isobutylene or ethyl methyl ethylene are preferred. The diolefins employed usually are ordinary open-chain conjugated diolefins having from [4] *5* to 8 carbon atoms, among which may be mentioned, in addition to the commonly used isoprene [or butadiene], such compounds as piperylene; 2,3-dimethyl-1,3-butadiene; 3-methyl-1,3-pentadiene; 2-methyl - 1,3 - pentadiene; 1,3-hexadiene; and 2,4-hexadiene. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubber.

The vulcanizing characteristics of Butyl rubber are quite distinct from the vulcanizing characteristics of the other synthetic rubbers and natural rubber, and, as a result, those skilled in the art have recognized Butyl rubber as generally presenting a special problem with respect to compounding for vulcanization. The peculiar problems encountered in attempting to cure Butyl rubber are believed to be largely a consequence of the extremely low unsaturation of the Butyl rubber, compared to that of the other vulcanizable rubbers. It is sometimes observed that substances which are good vulcanizing agents for other rubbers have little or no vulcanizing action on Butyl rubber. The special problems involved in curing Butyl rubber form the subject matter of a large number of published technical articles and issued patents. One aspect of the present invention is directed to a further improvement in the art of curing Butyl rubber.

Another aspect of the present invention lies in the provision of an improved curing bag. In the manufacture of pneumatic tires it is customary to employ an inflatable annular toroidal form, usually made of vulcanized rubber, and known as a curing bag or water bag. The curing bag is disposed within the raw tire casing as an aid in shaping the tire, and also for the purpose of applying internal heat and pressure to the tire casing in the molding press in which the tire is vulcanized. For this purpose the bag is inflated with a fluid heating medium, usually hot water, under pressure, which causes the bag to expand and thereby forces the tire casing into close conformity with the vulcanizing mold. Upon completion of the vulcanization, the curing bag is removed from the tire, and inserted in another raw tire for a repetition of the curing operation. The bag is thus repeatedly re-used for a number of cycles or turns.

The curing bag is subjected in use to a number of highly deleterious influences which place a definite limitation on the number of times the bag can be reused. Thus, each time a tire is vulcanized the bag is heated for prolonged periods to vulcanizing temperatures, with the result that the rubbery material from which the bag is made tends to become over-vulcanized. This condition is aggravated by the fact that the sulfur contained in the raw tire stock in contact with the curing bag surface tends to migrate or to diffuse into the bag material, and such migrated sulfur further vulcanizes the curing bag, to the extreme detriment of its physical properties. Also, the bag material is subject to oxidative attack as well as reversion, with resulting loss of elasticity and strength. Combination of these deleterious service conditions generally results in a rough or checked exterior surface on the bag which is directly transferred to the interior of a tire cured on the bag. This leaves the inner tire surface undesirably rough so as to aggravate tube chafing later on in service. The deterioration of the bag material advances with each successive cycle of use, until finally the bag is no longer fit for use and must be discarded.

In addition to the foregoing deleterious chemical influences, the bag is also subjected to considerable mechanical abuse, because it is severely twisted and rammed each time it is inserted in a raw tire casing, and it is roughly pulled and distorted each time it is removed from the finished tire. Sometimes the weakened bag material will develop a hole or crack during these operations, and if the failure is not discovered in time a defective tire will be produced. Even the smallest leak in the curing bag can lead to an improperly cured tire. There is also danger that a weakened bag will burst when the vulcanizing mold is opened, injuring the operator.

The resulting necessity for discarding the curing bag after it has been used a number of times represents an appreciable expense in the manufacture of tires, and those skilled in the art have consequently devoted much effort to improving the curing bag so as to render it capable of giving better and longer service.

The present invention has as a principal object the amelioration of the foregoing difficulties. The invention provides a curing bag made of a Butyl rubber composition cured by means of a phenol dialcohol.

Another object of the present invention is to provide an improved method of curing or vulcanizing Butyl rubber that is largely free from certain of the disadvantages of the prior art methods of vulcanizing Butyl.

Another object is the provision of improved Butyl vulcanizates characterized by superior aging qualities and enhanced resistance to over-vulcanization by migratory sulfur.

The invention is based on the unexpected discovery that Butyl rubber is readily vulcanizable with certain phenol dialcohols, namely, the para-substituted phenol dialcohols to yield vulcanizates having remarkably improved properties.

Suitable phenol dialcohols can be made from a para-alkyl-phenol and formaldehyde in the presence of alkali, as shown by Honel in U.S. Patent 1,996,069, or Charlton et al., in U.S. Patent 2,364,192, and others, and by modifications which are well known. The para substituted phenol dialcohols belong in the class of materials known as resols, and they are reactive because of their terminal methylol groups. They are distinguished from the novolacs, which are made in acid medium with less formaldehyde, and which contain no terminal methylol groups and are therefore not reactive. Although the para substituted phenol dialcohols are reactive, they are not to be confused with the ordinary thermosetting phenol formaldehyde condensate. The latter contains three available reactive positions (the two ortho positions and the para position) and forms insoluble, infusible three-dimensional cross-linked products. The para substituted phenol dialcohols, in contrast, contain only two reactive positions (the third being "blocked" by the para substituent) and can therefore undergo only linear condensation.

The Carswell volume entitled "Phenoplasts," published by Interscience Publishers, New York, 1950, on pp. 17–22, discusses the formation of the monocyclic and multicyclic phenol dialcohols from para substituted phenols and aldehydes.

Examples of monocyclic phenol dialcohols include 2,6-dimethylol-4-tert. butyl phenol; 2,6-dimethylol-4-octyl phenol; 2,6-dimethylol-4-phenyl phenol; 2,6-dimethylol-4-benzyl phenol; 2,6-dimethylol-4-(alpha,alpha-dimethylbenzyl) phenol; 2,6-dimethyl-4-dodecyl phenol; and 2,6-dimethylol-4-cyclohexyl phenol. In the foregoing materials the para substituent is an alkyl, cycloalkyl, aryl or aralkyl radical.

Multicyclic phenol dialcohols are the polymeric dialcohols containing in each molecule more than one phenolic residue which can be formed as shown in Carswell by heating the corresponding monocyclic dialcohol. They are properly termed "condensation polymers" of the monomeric (i.e. monocyclic) phenol dialcohols, or, less accurately, they are frequently termed merely "polymers" of the simple phenol dialcohols.

For convenience, the term "phenol dialcohol" will be used to refer to any of the above defined monocyclic or multicyclic compounds, or to mixtures thereof, unless otherwise stated.

The multicyclic phenol dialcohols used in the invention usually are mixtures of the compounds shown in Carswell to be formed by heating monocyclic phenol dialcohol. While the individual multicyclic phenol dialcohols can be used in the invention they are not usually easy to make in a pure state. It is preferred to use the mixture of compounds because they act as effectively as the individual compounds and are much cheaper. The preferred phenol dialcohols for use in the invention are those in which the para substituent on the phenolic nucleus is a hyrocarbon radical, and more especially an alkyl radical. Most preferred are the compounds in which R is an alkyl radical containing at least four carbon atoms.

In the preferred form of the invention Butyl rubber is vulcanized with the phenol dialcohols in the presence of carbon black. However, the Butyl rubber can also be vulcanized in the absence of any filler or in the presence of filters other than carbon black when using the multicyclic phenol dialcohols. The vulcanized products made without carbon black have useful properties, although they are less suitable for certain purposes than the products reinforced by carbon black. The non-black stocks find their greatest use in light colored products and products not requiring the reinforcement of carbon black. It is surprising to find that the multicyclic phenol dialcohols vulcanize the Butyl rubber even in the absence of carbon black, in view of the fact that the monocyclic phenol dialcohols do not vulcanize Butyl rubber to any practical degree in the absence of carbon black. In general, the multicyclic or polymeric phenol dialcohols are preferred because they are more efficient vulcanizing agents for Butyl than are the monocyclic phenol dialcohols.

A preferred form of the invention contemplates the use of the monocyclic phenol dialcohols in the form of their zinc salts, because the latter are easily powdered solids which are convenient to weigh and to handle. The crude commercial grades of the monocyclic phenols, in contrast to this, are usually very viscid liquids or sticky solids which are difficult to weigh accurately and to handle, and which are often malodorous and lachrymatory.

In practicing the invention the Butyl rubber and phenol dialcohol, and additionally any other desired optional ingredients such as accelerator, extender, plasticizer or fillers and the like, may be mixed in any convenient manner used in the rubber industry, i.e. on a mill or in in internal mixer. The compounded Butyl is then converted to any desired shape and size, and vulcanized at elevated temperatures, usually in the range of from 125 to 250° C., and preferably at 150 to 200° C. The vulcanization may be carried out in any commonly known manner, as in a mold under pressure, or in an open container in an oven, for a suitable period of time, usually within the range of from ¼ to 24 hours, the higher temperatures being employed with the shorter times within the stated ranges. The amount of phenol dialcohol used in the invention is preferably within the range of from 4 to 15 parts by weight to 100 parts of Butyl rubber. While smaller amounts may be used, e.g. 3 parts, it is usually found that less than 3 parts is insufficient to produce a practical cure. Also, larger amounts may be used, up to, for example, about 20 parts, but excessively large amounts are undesirable, since they tend to result in overcure and excessive brittleness in the product.

This new process of vulcanizing Butyl has the following advantages over the previously known processes.

(1) The Butyl stocks vulcanized by the new process have a far better resistance to aging by air and steam at high temperature than does Butyl rubber vulcanized with sulfur. For example, Butyl tire curing bags vulcanized by phenol dialcohols according to the invention can be used to cure up to five times as many tires as conventional Butyl curing bags vulcanized with sulfur. Thus, these stocks are especially useful in products which must be kept for considerable periods of time at high temperatures in the presence of air and/or steam. Such products, other than the curing bags already mentioned, are Butyl rubber motor mountings, steam hose, gaskets and belts for hot machinery, conveyor belts for moving hot materials, flexible hot air ducts, hot water bottles, etc.

(2) These new stocks may be used in contact with metals such as copper, silver, etc. which are tarnished by stocks vulcanized with sulfur.

(3) The compounded but unvulcanized stocks may be processed at higher temperatures without scorching than can stocks vulcanized by sulfur. This is particularly advantageous when shaping articles by injection molding.

(4) It is well known that free sulfur migrates from one stock to a second previously vulcanized one placed against it during vulcanization of the first one. This migration ordinarily causes the adjacent stock to be vulcanized also. This phenomenon causes a Butyl tire curing bag originally vulcanized with sulfur to be vulcanized further by additional sulfur migrating from the adjacent portions of the tire during vulcanization of the latter. This undesirable effect partially explains the relatively short service life of the curing bag, because it becomes progressively overvulcanized, and thus more susceptible to heat aging each time it is used to cure a tire. Also, some of the accelerator and any other compounding agents used in vulcanizing the Butyl bag with sulfur may migrate into the tire, causing unintentional and uneven changes in the vulcanization of the latter. It has been found that the phenol dialcohols used in the invention most fortunately either do not migrate into the adjacent tire or do not affect the tire if they do migrate. Consequently, the tire builder is now able as a result of the invention to control the uniformity of vulcanization of the tire more closely than heretofore, while at the same time obtaining a much greater service life from the curing bag.

The combination of advantages realized by the present vulcanization process renders the invention particularly suited for the manufacture of curing bags. In the accompanying drawing, the single figure illustrates a curing bag 1 made up of a vulcanizate of the invention. A suitable formulation for the curing bag is as follows:

| | Parts by weight |
|---|---|
| GR–I (a commercial grade of Butyl rubber made by copolymerizing isobutylene with isoprene, and containing about 2½% of combined isoprene) | 100.00 |
| Philblack "O" | 60.00 |
| Stearic acid | 1.00 |
| Amberol ST–137 (phenol dialcohol) | 12.00 |

Amberol ST–137 is a trade designation for a mixture of multicyclic phenol dialcohols believed to be made directly from 1 mole of p-octylphenol, 2 moles of formaldehyde and 1 mole of sodium hydroxide, the alkali being carefully neutralized after the condensation is complete. It is a resinous solid.

The above compound is shaped into the form of the curing bag 1 in accordance with conventional practice and is then cured in a mold at 350° F. for ½ hour. The curing bag 1 is an annular toroidal form and has an external shape corresponding to the interior contour of the pneumatic tire casing to be cured thereon, and is equipped with the usual connecting stem 2, by means of which a heated fluid under pressure, such as hot water, may be introduced into the interior cavity of the bag during vulcanization of the tire. The bag may thereby be expanded to cause the tire to conform closely to the surfaces of the mold cavity in which the tire is vulcanized.

It was found that the resulting curing bag was far superior to conventional curing bags in its resistance to the deteriorating influences outlined above. It was observed in actual factory trial of a curing bag made in this manner that the improved curing bag had a useful service life several times as great as the life of a bag made from Butyl rubber vulcanized with sulfur.

The invention is also applicable to that type of curing bag or blanket which is constructed integrally with the vulcanizing press, as described, for example, in the Soderquist Patent No. 2,296,800. Sectional curing bags, or retread curing bags, may also be made from the composition of the invention.

The following examples further illustrate various facets of the invention. All parts are by weight.

EXAMPLE 1

The following stocks were mixed on a mill, vulcanized in Chelsea slabs for 90 minutes at 195° C., and tested at room temperature.

| Stock | A–1 | A–2 | B | C | D | E |
|---|---|---|---|---|---|---|
| GRI (Butyl rubber) | 100 | 100 | 100 | 100 | 100 | 100 |
| Philblack O[a] | ------ | 50 | 50 | 50 | 50 | 50 |
| 2,6 - Dimethylol - 4 - tert - butylphenyl | 10 | ------ | 2 | 4 | 6 | 8 |
| Tensile strength (p.s.i.) | 35 | 70 | 380 | 1,180 | 1,400 | 1,390 |
| Elongation (percent) | 90 | ------ | 720 | 540 | 430 | 340 |
| Modulus at 200% elongation (p.s.i.) | ------ | ------ | 150 | 320 | 505 | 810 |

[a] A high abrasion furnace black.

This example shows the vulcanizing ability of this monocyclic dimethylol phenol according to the invention. It is evident that the optimum amount of the vulcanizing agent is between 6 and 8 parts, and that a stock containing only 2 parts is inadequately vulcanized. It is also apparent that both the phenol dialcohol and carbon black are needed to effect vulcanization of Butyl according to the invention. Stocks A–1 and A–2, shown only for contrast to the stocks (C–E) illustrating the invention, behave like unvulcanized Butyl alone.

EXAMPLE 2

The following stocks were mixed, cured and tested as in Example 1 except that the time of cure was 120 minutes.

| | F | G | H |
|---|---|---|---|
| GRI | 100 | 100 | 100 |
| Philblack O | 30 | 50 | 70 |
| 2,6-Dimethylol-4-tert.butylphenol | 6 | 6 | 6 |
| Tensile strength (p.s.i.) | 1,135 | 1,130 | 1,045 |
| Elongation (percent) | 585 | 550 | 455 |
| Modulus at 200% elongation (p.s.i.) | 195 | 350 | 440 |

As the carbon black is increased in amount the modulus is increased without much change in the tensile strength. It is apparent that the amount of carbon black can be varied widely.

EXAMPLE 3

These stocks were made up and tested as in Example 2.

| Stock | H | I | J | K | L |
|---|---|---|---|---|---|
| GRI | 100 | 100 | 100 | 100 | 100 |
| Philblack O | 70 | ------ | ------ | ------ | ------ |
| Shawinigan black [a] | ------ | 70 | ------ | ------ | ------ |
| Spheron 6 [b] | ------ | ------ | 70 | ------ | ------ |
| Philblack A [c] | ------ | ------ | ------ | 70 | ------ |
| Sterling 105 [d] | ------ | ------ | ------ | ------ | 70 |
| 2,6-Dimethylol-4-tert.-butyl-phenol | 6 | 6 | 6 | 6 | 6 |
| Tensile strength (p.s.i.) | 1,045 | 990 | 1,170 | 995 | 1,010 |
| Elongation (percent) | 455 | 440 | 505 | 370 | 530 |
| Modulus at 200% elongation (p.s.i.) | 440 | 500 | 420 | 490 | 395 |

[a] A non-reinforcing acetylene black.
[b] A medium processing channel black.
[c] A fast extruding furnace black.
[d] A reinforcing furnace black.

This example shows that the type of carbon black used in the invention is not critical.

EXAMPLE 4

Stock M, consisting of GRI 100 parts, carbon black 70 parts and 2,6-dimethylol-4-tert.-butylphenol 6 parts, was mixed on the mill, and then divided into portions which were vulcanized in Chelsea slabs under the conditions of time and temperature shown. The tests were made at room temperature.

| Temp. of Vulcan. (° C.) | Time of Vulcan. (hrs.) | Tensile Strength (p.s.i.) | Elong. (percent) | Mod. at 200% Elong. (p.s.i.) |
|---|---|---|---|---|
| 153 | 1 | 540 | 690 | 200 |
| | 3 | 1,230 | 460 | 430 |
| | 6 | 1,530 | 380 | 710 |
| | 16 | 1,720 | 320 | 975 |
| 166 | 1 | 1,060 | 470 | 400 |
| | 3 | 1,510 | 400 | 700 |
| | 6 | 1,570 | 310 | 840 |
| | 16 | 1,760 | 280 | 975 |
| 175 | 1 | 1,200 | 450 | 400 |
| | 3 | 1,650 | 350 | 760 |
| | 6 | 1,700 | 310 | 950 |
| 185 | 1 | 1,520 | 390 | 620 |
| | 2 | 1,550 | 350 | 770 |
| | 4 | 1,660 | 330 | 850 |
| 195 | 0.5 | 1,410 | 410 | 550 |
| | 1 | 1,500 | 380 | 670 |
| | 2 | 1,570 | 340 | 750 |

It is evident that the time and temperature of vulcanization in the operation of the invention can be varied widely.

EXAMPLE 5

These stocks were mixed on a mill, vulcanized for 3 hours at 166° C., and tested at room temperature.

| Stock | N | O | P |
|---|---|---|---|
| GRI | 100 | 100 | 100 |
| Carbon Black | 50 | 50 | 50 |
| 4-Methyl-2,6-dimethylolphenol | 6 | ------ | ------ |
| 4-Tert. butyl-2,6-dimethylolphenol | ------ | 6 | ------ |
| 4-Octyl-2,6-dimethylolphenol | ------ | ------ | 6 |
| Tensile strength (p.s.i.) | 540 | 1,770 | 1,930 |
| Elongation (percent) | 610 | 630 | 570 |
| Modulus at 200% elongation (p.s.i.) | 170 | 310 | 340 |

This example shows that the substituent on the position of the ring para to the phenolic group greatly influences the activity of the dimethylolphenol as a vulcanizing agent in the invention. The vulcanizing activity is seen to increase with increasing size of the para alkyl group, a most unexpected observation in view of the fact that there is experimental indication that vulcanization of Hevea and GR–S rubber by methylolphenols takes place through the dimethylol group.

EXAMPLE 6

These stocks were made and tested as in Example 2.

| Stocks | H | Q | R | S | T |
|---|---|---|---|---|---|
| GRI | 100 | 100 | 100 | 100 | 100 |
| Carbon black | 70 | 70 | 70 | 70 | 70 |
| 2,6-Dimethylol-4-tert.-butylphenol | 6 | 6 | 12 | ------ | ------ |
| Zinc salt of 2,6-dimethylol-4-tert.-butylphenol | ------ | ------ | ------ | 8 | 16 |
| Bardol [a] | ------ | 12 | 12 | 12 | 12 |
| Tensile strength (p.s.i.) | 1,045 | 670 | 1,060 | 690 | 995 |
| Elongation (percent) | 455 | 570 | 485 | 505 | 495 |
| Modulus at 200% elongation (p.s.i.) | 440 | 245 | 460 | 250 | 435 |

[a] A refined coal-tar distillate used as plasticizer.

Bardol, a typical softener used in compounding Butyl, is shown in this example to retard the vulcanization according to the invention. Comparison of stock Q with stock S and of stock R with stock T shows that the dimethylolphenol and its zinc salt are both excellent vulcanizing agents in the invention, provided that the same molecular amounts are used.

EXAMPLE 7

A mixture of multicyclic phenol dialcohols of the type used in the invention was made by heating 2,6-dimethylol-4-tert.-butyl-phenol at high temperature to obtain chiefly the methylene-bridged compounds. Three multicyclic phenol dialcohol mixtures were made from the monocyclic phenol dialcohol at low temperature by heat alone and in the presence of an acidic and an alkaline catalyst respectively to obtain chiefly the methylene ether-bridged compounds. Each of these four mixtures, as well as the similar mixture Amberol ST–137, was blended into a stock in a Banbury mixer, and the stocks were vulcanized in Chelsea slabs for 30 minutes at 165° C., and tested at room temperature.

| Stock | U | V | W | X | Y |
|---|---|---|---|---|---|
| GR–I | 100 | 100 | 100 | 100 | 100 |
| Carbon Black | 70 | 70 | 70 | 70 | 70 |
| Amberol ST–137 | 6 | ------ | ------ | ------ | ------ |
| High temperature Dialcohol (Neutral) [a] | ------ | 6 | ------ | ------ | ------ |
| Low temperature Dialcohol #1 (Neutral) [b] | ------ | ------ | 6 | ------ | ------ |
| Low temperature Dialcohol #2 (Acidic) [c] | ------ | ------ | ------ | 6 | ------ |
| Low temperature Dialcohol #3 (Alkaline) [d] | ------ | ------ | ------ | ------ | 6 |
| Tensile strength (p.s.i.) | 770 | 940 | 910 | 800 | 990 |
| Elongation (percent) | 490 | 360 | 450 | 400 | 400 |
| Modulus at 200% elongation (p.s.i.) | 385 | 550 | 465 | 465 | 560 |

[a] The monocyclic dialcohol was heated for 18 minutes at 135–160° C. with continuous stirring.

[b] The monocyclic dialcohol was heated for 50 minutes at 120–135° C. with continuous stirring.

[c] The monocyclic dialcohol (100 parts) was heated for 51 minutes at 130–135° C. in the presence of 1 part of concd. hydrochloric acid with continuous stirring.

[d] The monocyclic dialcohol (100 parts) was heated for 28 minutes at 125–135° C. in the presence of 1 part of 10% aqueous sodium hydroxde with continuous stirring.

It is evident that while the vulcanization time was too short to give optimum vulcanization of these stocks at 165° C. all five of these multicyclic phenol dialcohol mixtures are effective in vulcanizing Butyl rubber according to the invention.

EXAMPLE 8

These stocks were mixed in a Banbury, vulcanized at the temperatures and times shown, and tested as usual.

| Stock | Z | AA | AB | AC | AD | AE | AF | AG |
|---|---|---|---|---|---|---|---|---|
| GR–1 | 100 | 100 | 100 | 100 | 100 | 100 | 100 | 100 |
| Carbon Black | 70 | 70 | 70 | 70 | 70 | 70 | 70 | 70 |
| 2,6 - Dimethylol - 4 -tert. - butyl - phenol | 6 | 6 | 6 | 6 | ------ | ------ | ------ | ------ |
| Multicyclic dialcohol [a] | ------ | ------ | ------ | ------ | 6 | 6 | 6 | 6 |
| Vulcanization temp. (° C.) | 165 | 165 | 195 | 195 | 165 | 165 | 195 | 195 |
| Vulcanization time (min.) | 30 | 90 | 30 | 60 | 30 | 90 | 30 | 60 |
| Tensile strength (p.s.i.) | 260 | 750 | 870 | 1,050 | 1,060 | 1,670 | 1,520 | 1,820 |
| Elongation (percent) | 560 | 450 | 460 | 390 | 410 | 310 | 340 | 310 |
| Modulus at 200% elongation (p.s.i.) | 200 | 400 | 405 | 540 | 535 | 900 | 825 | 1,000 |

[a] The low temperature neutral phenol dialcohol #1 described in Example 7.

This example shows that the multicyclic phenol dialcohol vulcanizes Butyl rubber according to the invention both more rapidly and to a greater degree than the corresponding monocyclic phenol dialcohol.

EXAMPLE 9

Stocks AH and AI were mill mixed and vulcanized in Chelsea slabs. AH is a typical curing bag stock vulcanized conventionally with sulfur. Stock AJ, a typical tire carcass stock, was mill mixed and sheeted into thin slabs, and then vulcanized for 45 minutes at 145° C. between the slabs of AH and AI respectively in order to show the effect of migration of vulcanizing agent and/or accelerator from the curing bag stock into the adjacent carcass stock.

| Stock | AH | AI |
|---|---|---|
| GR–I | 100 | 100 |
| Carbon black | 70 | 70 |
| Zinc Oxide | 30 | 30 |
| Stearic Acid | 1 | ------- |
| Tuex [a] | 1 | ------- |
| MBT [b] | 0.5 | ------- |
| Sulfur | 2 | ------- |
| Bardol | 12 | 12 |
| 2,6-Dimethyl-4-tert,-butylphenol | ------- | 12 |
| Vulcanization time (min.) | 45 | 60 |
| Vulcanization temp. (° C.) | 145 | 195 |

[a] Tetramethyl thiuram disulfide.
[b] Mercaptobenzothiazole.

| Stock | AJ |
|---|---|
| Smoked sheet | 100 |
| Zinc oxide | 40 |
| Pine tar | 2 |
| Stearic acid | 2 |
| BLE [a] | 1.5 |
| MBT | 0.5 |
| Sulfur | 3.5 |

[a] An acetone-diphenylamine condensation product used as an antioxidant.

The physical properties of AJ after being vulcanized between slabs of the previously vulcanized sulfur stock AH and phenol dialcohol stock AI respectively were found to be as follows:

| | With Sulfur (AH) | With Dialcohol (AI) |
|---|---|---|
| Tensile strength (p.s.i.) | 825 | 3,940 |
| Elongation (percent) | 590 | 780 |
| Modulus at 200% elongation (p.s.i.) | 225 | 200 |

This example shows that the conventional curing bag stock badly injures thin slabs of the carcass stock during vulcanization of the latter whereas the curing bag stock vulcanized according to the invention does not harm the carcass stock.

EXAMPLE 10

A masterbatch of 100 parts of GR–I, 50 parts of carbon black and 6 parts of the high temperature neutral multicyclic phenol dialcohol described in Example 7 was made up and divided into two portions. Some p-chlorobenzoic acid was mixed into one portion as shown below. Each stock was then divided into portions which were vulcanized at 165° C. for the times shown, and tested as usual.

| Stock | AK | AN |
|---|---|---|
| Masterbatch | 156 | 156 |
| p-Chlorobenzoic acid | ------- | 1 |
| Tensile strength (p.s.i.): | | |
| 15 [a] | 550 | 850 |
| 30 | 850 | 1,300 |
| 60 | 1,340 | 1,620 |
| 120 | 1,560 | 1,860 |
| 240 | 1,770 | 1,880 |
| Elongation (percent): | | |
| 15 | 780 | 700 |
| 30 | 640 | 500 |
| 60 | 550 | 460 |
| 120 | 480 | 420 |
| 240 | 440 | 330 |
| Modulus at 200% elong. (p.s.i.): | | |
| 15 | 180 | 250 |
| 30 | 270 | 410 |
| 60 | 350 | 510 |
| 120 | 500 | 680 |
| 240 | 660 | 810 |

[a] Time of vulcanization (minutes).

This example shows that organic acids have a favorable effect on the vulcanization of GR–I by a multicyclic phenoldialcohol. Comparison of stock AN with AK shows that the carboxylic acid has little or no accelerating effect but does act as an extended, i.e., as if a larger amount of the vulcanizing agent had been used. Other carboxylic acids which behave like p-chlorobenzoic acid in being vulcanization extenders in the invention are stearic acid, benzoic acid, salicyclic acid and phthalic acid.

EXAMPLE 11

A masterbatch in the proportion of 100 parts of Butyl and 70 parts of carbon black was mixed. To separate portions of it each of the following 2,6-dimethylol-4-R-phenols was added. The stocks were vulcanized for 240 minutes at 165° C. and tested as usual.

| Stock | AQ | AR | AS | AT |
|---|---|---|---|---|
| Masterbatch | 170 | 170 | 170 | 170 |
| 2,6-Dimethylol-4-R-phenol (R as shown): | | | | |
| Phenyl | 6 | ------ | ------ | ------ |
| Benzyl | ------ | 6 | ------ | ------ |
| Alpha-alpha-Dimethylbenzyl | ------ | ------ | 6 | ------ |
| Cyclohexyl | ------ | ------ | ------ | 6 |
| Tensile strength (p.s.i.) | 730 | 510 | 790 | 650 |
| Elongation (percent) | 400 | 480 | 470 | 510 |
| Modulus at 200% elongation (p.s.i.) | 375 | 300 | 350 | 280 |

This example shows that monocyclic phenol dialcohols having considerable variation in the substituent on the 4-position vulcanize GR–I according to the invention.

EXAMPLE 12

Each of the 2,6-dimethylol-4-R-phenols shown in Example 11 was heated at about 150° C. in order to convert it to a multicyclic phenol dialcohol mixture. Then each of these mixtures was milled into a separate portion of the masterbatch described in Example 11. The stocks were vulcanized as in Example 11 and tested as usual.

| Stock | AU | AV | AW | AX |
|---|---|---|---|---|
| Masterbatch | 170 | 170 | 170 | 170 |
| Multicyclic phenol dialcohol made from monocyclic one, in which R is: | | | | |
| Phenyl | 6 | ------ | ------ | ------ |
| Benzyl | ------ | 6 | ------ | ------ |
| Alpha-alpha-Dimethyl-benzyl | ------ | ------ | 6 | ------ |
| Cyclohexyl | ------ | ------ | ------ | 6 |
| Tensile strength | 810 | 570 | 1,030 | 1,140 |
| Elongation (percent) | 310 | 350 | 350 | 370 |
| Modulus at 200% elongation (p.s.i.) | 470 | 380 | 510 | 500 |

This example shows that the 4-substituent of multicyclic phenol dialcohols can be varied widely within the limits of the invention.

Comparison of Examples 11 and 12 shows that the multicyclic phenol dialcohols vulcanize Butyl to a greater extent than the corresponding monocyclic phenol dialcohols.

EXAMPLE 13

These stocks were mixed as usual. The amount of GR–I in stock AY and of the filler in stocks AZ, BA, BB, BC, BD and BE was so adjusted that the total volume of each stock was the same. The stocks were vulcanized at 165° C. for the times shown, and tested at room temperature.

| Stock | AY | AZ | BA | BB | BC | BD | BE |
|---|---|---|---|---|---|---|---|
| GR-I | 150 | 100 | 100 | 100 | 100 | 100 | 100 |
| Amberol ST-137 | 8 | 8 | 8 | 8 | 8 | 8 | 8 |
| Carbon black | | 50 | | | | | |
| Whiting [a] | | | 72 | | | | |
| Purecal U [b] | | | | 72 | | | |
| Suprex Clay [c] | | | | | 72 | | |
| Silene EF [d] | | | | | | 58 | |
| Hi-Sil [e] | | | | | | | 54 |
| Tensile strength (p.s.i.): | | | | | | | |
| 60′ cure | 570 | 1,610 | 620 | 750 | 410 | 500 | 510 |
| 240′ cure | 810 | 2,010 | 660 | 1,220 | 540 | 680 | 640 |
| Elongation (percent): | | | | | | | |
| 60′ cure | 1,100 | 890 | 1,130 | 1,200 | 980 | 1,240 | 1,480 |
| 240′ cure | 1,000 | 650 | 910 | 1,060 | 870 | 1,220 | 1,330 |
| 300% Modulus: | | | | | | | |
| 60′ cure | 60 | 275 | 100 | 70 | 125 | 85 | 80 |
| 240′ cure | 75 | 600 | 135 | 100 | 175 | 115 | 90 |

[a] Impure calcium carbonate.
[b] Precipitated calcium carbonate.
[c] Aluminum silicate.
[d] Calcium silicate.
[e] Silicon dioxide (hydrated).

This example shows, by contrast with stock A of Example 1, that a multicyclic phenol dialcohol vulcanizes Butyl satisfactorily in the absence of any filler, and in the presence of typical non-black fillers. It is also evident that, while these fillers vary among themselves in their effect on the properties of the vulcanized stocks, carbon black is considerably superior to any of them.

Having thus described our invention, what we claim and desire to protect by Letters Patent is:

1. A curing bag comprising an annular resilient form adapted to conform to the interior contour of a pneumatic tire casing and defining an interior cavity inflatable with a fluid medium to cause a tire casing to conform to a mold, said bag being comprised of a rubbery copolymer of an isoolefin having from 4 to 7 carbon atoms and from 0.5% to 10% of [a conjugated diolefin having from 4 to 8 carbon atoms] *isoprene,* vulcanized with from 3 to 20 parts of a condensation polymer of a 2,6-dimethylol-4-hydrocarbon substituted phenol, per 100 parts of the said rubbery copolymer, the said hydrocarbon substituent being selected from the group consisting of alkyl, cycloalkyl, aryl and aralkyl radicals.

2. A curing bag comprising an annular resilient form adapted to conform to the interior contour of a pneumatic tire casing and defining an interior cavity inflatable with a fluid medium to cause a tire casing to conform to a mold, said bag being comprised of a rubbery copolymer of isobutylene with from 0.5 to 5% of isoprene, vulcanized with from 3 to 20 parts of a condensation polymer of a 2,6-dimethylol-4-alkyl phenol, per 100 parts of the said rubbery copolymer.

3. A curing bag as in claim 2 in which the said alkyl group is a butyl group.

4. A curing bag as in claim 2 in which the said alkyl group is an octyl group.

5. An elastic vulcanizate comprising carbon black and a rubbery copolymer of an isoolefin having from 4 to 7 carbon atoms with from 0.5 to 10% of a conjugated diolefin having from [4] 5 to 8 carbon atoms, vulcanized with from 3 to 20 parts of a 2,6-dimethylol-4-hydrocarbon substituted phenol, per 100 parts of the said rubbery copolymer, the said hydrocarbon substituent being selected from the group consisting of alkyl, cycloalkyl, aryl and aralkyl radicals.

6. An elastic vulcanizate comprising carbon black and a rubbery copolymer of an isoolefin having from 4 to 7 carbon atoms with from 0.5 to 10% of a conjugated diolefin having from [4] 5 to 8 carbon atoms, vulcanized with from 3 to 20 parts of a 2,6-dimethylol-4-alkyl phenol, per 100 parts of the said rubbery copolymer.

7. An elastic vulcanizate comprising a rubbery copolymer of an isoolefin having from 4 to 7 carbon atoms with from 0.5 to 10% of a conjugated diolefin having from [4] 5 to 8 carbon atoms, vulcanized with from 3 to 20 parts of a condensation polymer of a 2,6-dimethylol-4-hydrocarbon substituted phenol, per 100 parts of the said rubbery copolymer, the said hydrocarbon substituent being selected from the group consisting of alkyl, cycloalkyl, aryl and aralkyl radicals.

8. An elastic vulcanizate comprising a rubbery copolymer of an isoolefin having from 4 to 7 carbon atoms with from 0.5 to 10% of a conjugated diolefin having from [4] 5 to 8 carbon atoms, vulcanized with from 3 to 20 parts of a condensation polymer of a 2,6-dimethylol-4-alkyl phenol, per 100 parts of the said rubbery copolymer.

9. An elastic vulcanizate comprising a rubbery copolymer of isobutylene with from 0.5 to 5% of isoprene, vulcanized with from 3 to 20 parts of a condensation polymer of a 2,6-dimethylol-4-alkyl phenol, per 100 parts of the said rubbery copolymer.

10. An elastic vulcanizate as in claim 9 in which the said alkyl group is a butyl group.

11. An elastic vulcanizate as in claim 9 in which the said alkyl group is an octyl group.

12. A method comprising in combination the steps of mixing carbon black and a rubbery copolymer of an isoolefin having from 4 to 7 carbon atoms with from 0.5 to 10% of a conjugated diolefin having from [4] 5 to 8 carbon atoms, and from 3 to 20 parts of a 2,6-dimethylol-4-hydrocarbon substituted phenol per 100 parts of the said rubbery copolymer, shaping the said mixture, and thereafter heating the shaped mixture at a temperature of from 125° to 250° C. for from ¼ hour to 24 hours until the mixture attains an elastic, vulcanized state, the said hydrocarbon substituent being selected from the group consisting of alkyl, cycloalkyl, aryl and aralkyl radicals.

13. A method comprising in combination the steps of mixing carbon black and a rubbery copolymer of an isoolefin having from 4 to 7 carbon atoms with from 0.5 to 10% of a conjugated diolefin having from [4] 5 to 8 carbon atoms, and from 3 to 20 parts of a 2,6-dimethylol-4-alkyl phenol per 100 parts of the said rubbery copolymer, shaping the said mixture, and thereafter heating the shaped mixture at a temperature of from 125° to 250° C. for from ¼ hour to 24 hours until the mixture attains an elastic, vulcanized state.

14. A method comprising in combination the steps of mixing a rubbery copolymer of an isoolefin having from 4 to 7 carbon atoms with from 0.5 to 10% of a conjugated diolefin having from [4] 5 to 8 carbon atoms, and from 3 to 20 parts of a condensation polymer of a 2,6-dimethylol-4-hydrocarbon substituted phenol per 100 parts of the said rubbery copolymer, shaping the said mixture, and thereafter heating the shaped mixture at a temperature of from 125° to 250° C. for from ¼ to 24 hours until the mixture obtains an elastic, vulcanized state, the said hydrocarbon substituent being selected from the group consisting of alkyl, cycloalkyl, aryl and aralkyl radicals.

15. A method comprising in combination the steps of mixing a rubbery copolymer of an isoolefin having from 4 to 7 carbon atoms with from 0.5 to 10% of a conjugated diolefin having from [4] 5 to 8 carbon atoms, and from 3 to 20 parts of a condensation polymer of a 2,6-dimethylol-4-alkyl phenol per 100 parts of the said rubbery copolymer, shaping the said mixture, and thereafter heating the shaped mixture at a temperature of from 125° to 250° C. for from ¼ to 24 hours until the mixture obtains an elastic, vulcanized state.

16. A method comprising in combination the steps of mixing a rubbery copolymer of isobutylene with from 0.5 to 5% of isoprene and from 3 to 20 parts of a condensation polymer of a 2,6-dimethylol-4-alkyl phenol per 100 parts of the said rubbery copolymer, shaping the said mixture, and thereafter heating the shaped mixture at a temperature of from 150 to 200° C. for from ¼ hour to 24 hours until the mixture attains an elastic, vulcanized state.

17. A method as in claim 16 in which the said alkyl group is a butyl group.

18. A method as in claim 16 in which the said alkyl group is an octyl group.

References Cited in the file of this patent

UNITED STATES PATENTS

| | | |
|---|---|---|
| 2,305,412 | Frolich | Dec. 15, 1942 |
| 2,429,397 | Compton et al. | Oct. 21, 1947 |
| 2,476,824 | Albert | July 19, 1949 |
| 2,519,231 | Crawford | Aug. 15, 1950 |
| 2,529,027 | Lamb | Nov. 7, 1950 |

| | | |
|---|---|---|
| 2,649,431 | Little | Aug. 18, 1953 |
| 2,649,432 | Little | Aug. 18, 1953 |

OTHER REFERENCES

Serial No. 357,662, Wildschut (A.P.C.), published April 20, 1943.

"Industrial and Engineering Chemistry," vol. 41, No. 3, page 592, March 1949.

"Rubber Age," page 449, January 1947.

"Phenoplasts," by T. S. Carswell, November 1947, pages 10–12.